United States Patent [19]
Gutman et al.

[11] Patent Number: 5,130,993
[45] Date of Patent: Jul. 14, 1992

[54] TRANSMITTING ENCODED DATA ON UNRELIABLE NETWORKS

[75] Inventors: Michael Gutman, Newton; Michael G. Hluchyj, Wellesley; James A. Pasco-Anderson, Needham, all of Mass.

[73] Assignee: Codex Corporation, Mansfield, Mass.

[21] Appl. No.: 458,769

[22] Filed: Dec. 29, 1989

[51] Int. Cl.[5] ............................................. G06F 11/10
[52] U.S. Cl. ...................................... 371/42; 371/37.1
[58] Field of Search .................... 371/42, 47.1, 32, 33, 371/37.1, 41; 375/108, 109, 118; 341/60, 94; 380/48

[56] References Cited

U.S. PATENT DOCUMENTS

| | | | |
|---|---|---|---|
| 3,471,830 | 10/1969 | McRae | 371/42 X |
| 3,571,794 | 3/1971 | Tong | 371/42 |
| 3,641,494 | 2/1972 | Perrault | 371/32 |
| 4,110,558 | 8/1978 | Kageyama | 371/42 X |
| 4,172,963 | 10/1979 | Belcher | 371/42 X |
| 4,332,027 | 5/1982 | Malcolm | 371/33 X |
| 4,654,480 | 3/1987 | Weiss | 380/48 |
| 4,893,339 | 1/1990 | Bright | 380/48 X |

OTHER PUBLICATIONS

CCITT Recommendation V.42bis.
Data Compression: Methods and Theory—James A. Storer.
Data Networks: Dimitri Bertsekas.
A Universal Algorithm for Sequential Data Compression: Lempel.

*Primary Examiner*—Robert W. Beausoliel
*Attorney, Agent, or Firm*—Darleen J. Stockley

[57] ABSTRACT

Information encoded by data compression (or another data encoding technique, e.g., encryption, requiring synchronization between the encoder and decoder) is transmitted over an unreliable network by checking for transmission errors after decoding. If an error is detected, the encoder is reset, using a reset protocol which may operate over an unreliable reverse channel by using a timer to generate further reset requests when the receiver does not acknowledge them in a timely fashion.

21 Claims, 3 Drawing Sheets

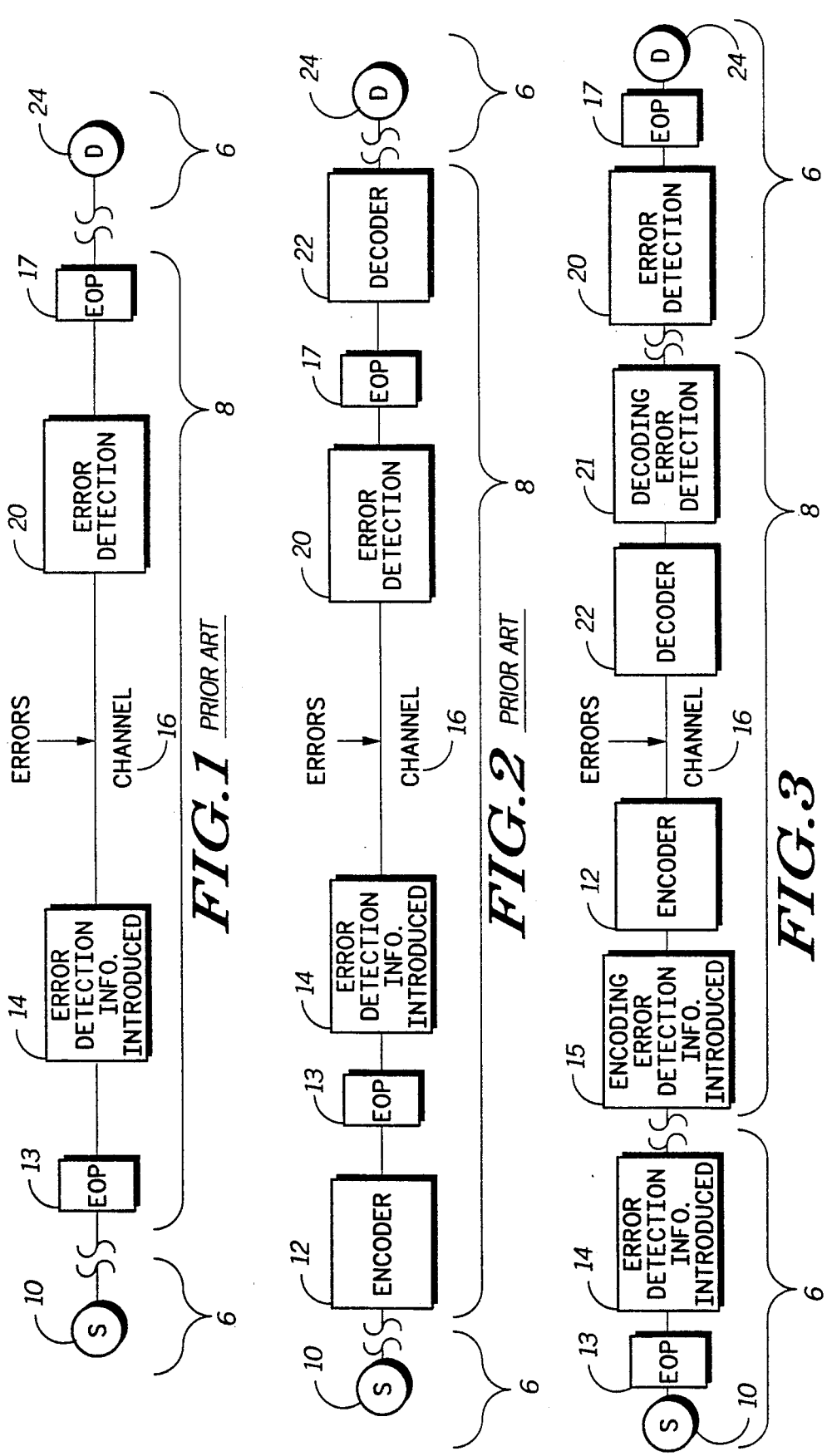

TRANSMITTING ENCODED DATA ON UNRELIABLE NETWORKS

BACKGROUND OF THE INVENTION

This invention relates to communication systems and in particular to the application of data encoding techniques, such as data compression, to unreliable networks.

Packet-switched digital communication networks allow digital systems to communicate with each other. They typically include several nodes which may transmit, receive or forward data. Data to be transmitted are loaded into frames, along with a destination address which determines which node is to receive the frame. The frames are sent from one node to another either directly or via a series of intermediate nodes. The communication channel established between nodes in a network is known as a virtual circuit.

Packet-switched data may be transmitted over a reliable network, in which error recovery is built into the network. For example, an error checking system, such as CRC error checking, may be provided between the nodes of a network. In this arrangement, whenever a receiving node detects an error in a received frame, it requests retransmission of that frame from the sending node.

In some protocols, the sender retransmits every frame that has been transmitted since the last error upon discovery of that error. This type of protocol is called "go-back-n". Alternatively, the sender may simply retransmit those frames that are in error. This type of protocol is called "selective retransmission".

On some networks, especially those with low error rates, no error recovery is included. On these "unreliable networks", the end systems are left to recover from any errors over the network as they see fit. Typically, the receiving end system will use a reverse channel to acknowledge the reception of frames to the sending end system. Frames that are not received are not acknowledged, and frames that are received with errors initiate error recovery procedures. The frames are then retransmitted by the sender. In these "unreliable networks", increased data throughput is often achieved by having the network nodes simply drop frames when errors are detected, without attempting error recovery. The end systems have the task of detecting the loss of frames, and requesting retransmission.

It is advantageous to perform data compression on data that are sent through the network, as this reduces the amount of data to be sent through the network. This is usually accomplished by sending the data over a reliable network, i.e., one in which error recovery is provided inside of the data compression encoding and decoding.

Other forms of data encoding are also useful, such as scrambling or encryption. These operations are also usually accomplished by sending the encoded data over a reliable network.

Many powerful data encoding methods need to remain synchronized. This synchronization can be broken when a frame is received containing errors or is lost altogether. Adaptive and variable field length data encoding are two methods that require synchronization. In adaptive compression, the vocabularies used to encode and decode a compressed frame change as a function of the data being sent. The vocabulary at the encoder and the vocabulary at the decoder must remain synchronized. An error will usually affect the vocabulary of the receiver and cause it to decode all subsequent frames erroneously. In variable field length systems, errors may cause data to be interpreted using different field lengths than those with which the data were intended to be decoded. These data encoding methods will usually continue to operate erroneously if they are not resynchronized and will often tend to progress to a state where all data are received erroneously.

The resynchronization of the decoder can be achieved by resetting each of them to the same predetermined state. This predetermined state could be fixed or could change with time.

SUMMARY OF THE INVENTION

In general, the invention features transmitting encoded (e.g., compressed or encrypted) data over an unreliable network, by checking for transmission errors after decoding, and resetting the encoder if an error is detected. Synchronization of encoding and decoding can thereby be maintained.

In preferred embodiments, error detection information is added prior to encoding (e.g., by adding a CRC); the encoder is reset using a reset protocol which may operate over an unreliable reverse channel by using a timer to generate further reset requests when the receiver does not acknowledge them in a timely fashion; transmission is across a network having a plurality of nodes, so that a plurality of possible paths exist between the edge nodes across which the method is practiced; error correction is accomplished by separate error detection means, typically provided by the end systems.

In a second aspect, the invention features periodically resetting the encoder to reduce the number of frames affected by an error. This can provide more efficient error recovery when there is selective retransmission of frames (instead of go-back-n retransmission) as fewer bad frames may be sent as a consequence of an error.

The invention has the advantage of allowing synchronized encoding of data over an unreliable channel in an essentially transparent fashion. This is done despite the tendency of error propagation in synchronized data encoding methods. In fact, the invention takes advantage of this tendency in order to provide detection of out-of-sequence frames. Hence, in the case of data compression, an unreliable network can be provided with enhanced throughput. Data compression and other methods may thus be used without the expense of a network error recovery system in addition to what the end systems are already using.

Other advantages and features of the invention will become apparent from the following description of the preferred embodiment, and from the claims.

DESCRIPTION OF THE PREFERRED EMBODIMENT

FIG. 1 is a block diagram of a prior art network.

FIG. 2 is a block diagram of a prior art data encoding method as applied to the network of FIG. 1.

FIG. 3 is a block diagram of the data encoding method of the invention.

Figure 4:
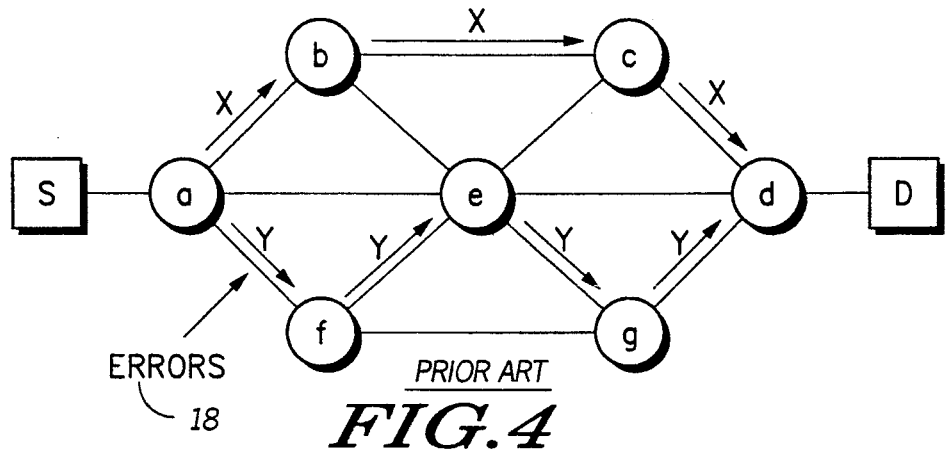
FIG. 4 is a schematic outline of an illustrative communication network as is known in the art.

In a simple reliable network (FIG. 1), the network, itself, incorporates error recovery. End system 6 (source S) applies data to network 8, which is made reliable by elements of procedure 13,17 and error detection blocks 14,20, the operation of which is well known in the art. Error detection information, such as a cyclic redundancy code (CRC), is added to the encoded data by error detection code generator 14. The resulting data are transmitted across channel 16, which may be a virtual circuit in a network, such as the one indicated by X or Y in the network shown schematically in FIG. 4. Within this channel 16, errors are randomly introduced in the data. These errors may arise from a variety of sources, such as crosstalk, induced spikes, or power line surges.

Errors introduced in transmitting the data over the channel 16 are detected (using the error detection information) by error detector 20, which, in conjunction with the receiving end's elements of procedure 17, causes a request for retransmission to be sent to the transmitting end's elements of procedure 13 over a reverse channel (not shown in FIG. 1). In some networks, the elements of procedure and error recovery blocks shown in FIG. 1 are repeated at numerous nodes along the virtual circuit (FIG. 4).

If no errors are detected, the received data are passed on to the end system 6 at the destination. The source 10 may thus send data and expect them to arrive at the destination 24 with no errors, though some of the data may have to be retransmitted between network nodes during this process.

Referring to FIG. 2, the usual prior art method of incorporating data compression into a network system is to add an encoder 12 before the transmission end's elements of procedure 13, and to add a decoder 22 after the receiving end's elements of procedure 17.

In this approach, the source 10 applies data to be transmitted to the encoder 12 which encodes these data using a data encoding algorithm. This algorithm may be a data compression algorithm such as an adaptive data compression algorithm, or it may be another type of algorithm, such as an encryption algorithm. These methods of data encoding are well known in the art.

The encoded data are passed on to the transmitting end's elements of procedure 13 and error detection code generator 14 which adds error detection information and transmits the data over channel 16 where errors may be introduced.

Error detector 20 receives the transmitted data and checks them for errors. If errors are detected, the receiving end's elements of procedure 17 will request retransmission of the data as described above. Thus, the decoder 22 will always receive data free of channel errors, will always remain in synchronization with the endcoder 12, and will decode these data and pass them on to the destination 24.

The preferred embodiment of the invention is structured differently, as may be seen in FIG. 3. The elements of procedure 13, 17 and error detection blocks 14,20 are moved outside of the network system 8, and reside in the end systems 6. The data compression encoder 12 and decoder 2 remain within the network system 8, but error detection blocks 15,21 have been added outside of the encoder and decoder. A second error detection code generator 15 (e.g., a CRC generator) is ahead of encoder 12 at the transmitting end. A second error detector 21 is downstream of the decoder 22.

Within the transmitting end system 6, source 10 applies data to the transmitting end's elements of procedure 3, which passes the data on to the error detection code generator 14, which, in turn, introduces error detection information into the data.

The data are then passed to the network system 8, where a second error detection code generator 15, this one, a part of the encoding system, introduces further error detection information into the data. The data are then encoded in encoder 12 and transmitted over channel 16.

At the receiving end, the data are decoded in decoder 22. Errors introduced on channel 16 may be present in the data and, if so, the decoded data will also contain errors. In using data encoding methods that require synchronization, errors will typically cause more errors, which will, in turn, cause further errors, and very quickly the decoder will be generating a stream of completely erroneous data. In the case of adaptive data compression, this arises because the vocabulary used to decode the data is dependent on the data themselves, and once it is flawed it decodes the data incorrectly. This erroneously decoded data leads to a more flawed vocabulary, which leads to more erroneously decoded data, and so on. It should also be noted that, because the data compression is continuous across frames (i.e. the vocabulary is not reset for each frame), missing or out-of-sequence frames will also be decoded incorrectly.

Received data is also supplied to error detector 20 in the end system 6 at the destination, which works in conjunction with the receiving end's elements of procedure 17 too require retransmission of erroneous frames, in the conventional way. However, before retransmission may occur, the data encoding method must be reset, otherwise the retransmitted frames would be decoded erroneously. To this end, decoding error detector 21 sends a reset request to encoder 12 over a reverse channel.

Figure 5:
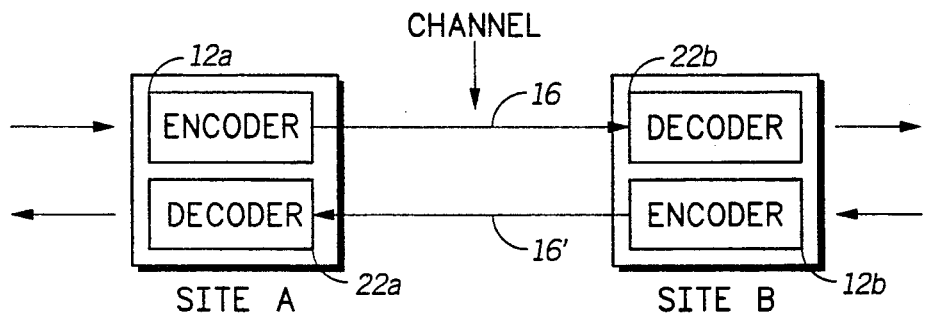
FIG. 5 is a block diagram of a full-duplex encoder-decoder pair.

The relationship between a channel and its reverse channel is illustrated in FIG. 5. Referring to this figure, it can be seen that encoder 12a encodes data to be sent across channel 16 to be decoded by decoder 22b. At the same time, encoder 12b may encode data to be sent across channel 16' to be decoded by decoder 22a. Channel 16' is the reverse channel for channel 16, and vice-versa. This reverse channel 16' is used by the decoding error detector 21 to send reset requests when an error is detected in the data decoded by decoder 22b.

Figure 6:
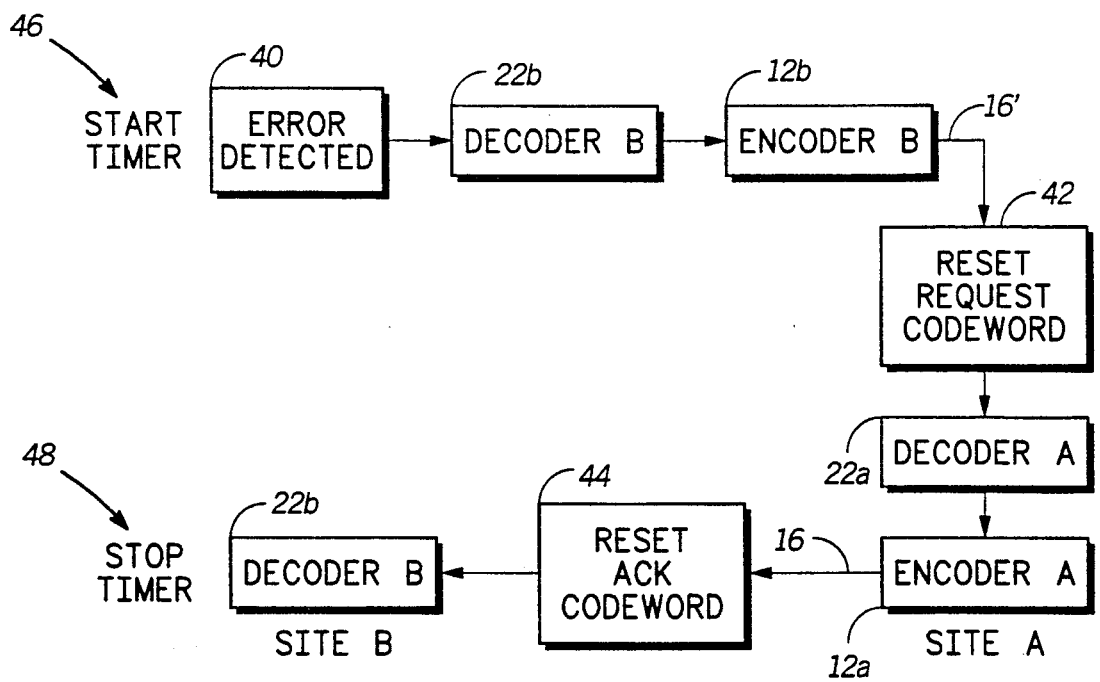
FIG. 6 is a flow chart of the data encoding reset protocol phases.
Figure 7:
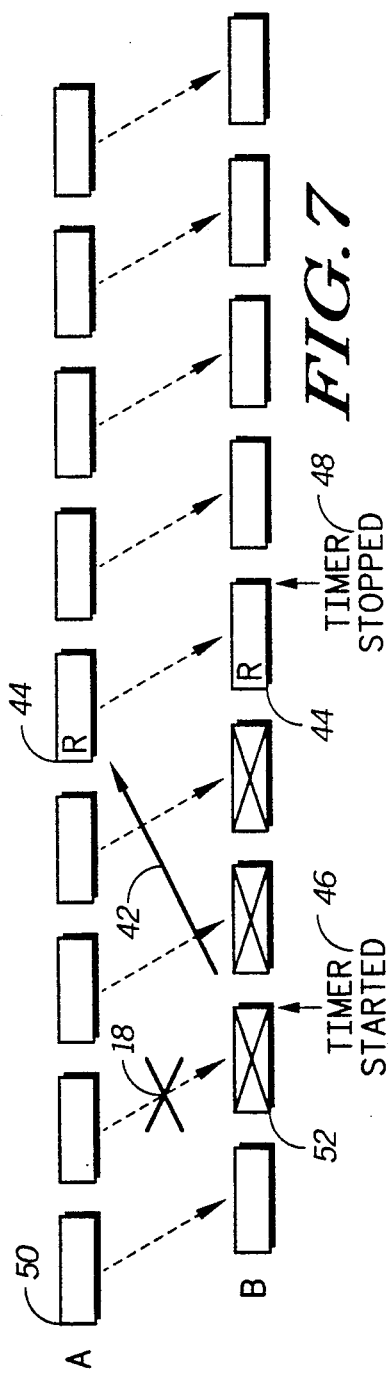
FIG. 7 is a chart of an error being corrected using the data encoding reset protocol of the invention and its effect on the data frames.

As the reverse channel is also unreliable, an error-tolerant reset protocol is used for the reset operation. Referring to FIGS. 6 and 7, this protocol is initiated when an erroneous frame 52 is detected at the decoder 22b. When this error 18 is detected (at 40 in FIG. 6), the decoder 22b site B starts a timer 46 and causes the encoder 12b to send a reset request codeword 42 over channel 16'. This codeword 42 is received by decoder 22a which instructs the encoder 12a to reset its data encoding algorithm. In addition to resetting itself, the encoder 12a also acknowledges reception of the reset request codeword 42 by inserting a reset acknowledgement codeword 44 in a frame 50. This frame is sent over channel 16 to decoder 22b which then stops the timer 48 and resets its data decoding algorithm. At this point, the decoder-encoder pair are resynchronized and they are ready to communicate properly with one another, beginning with the data following the reset acknowledgement codeword 44.

Figure 8:
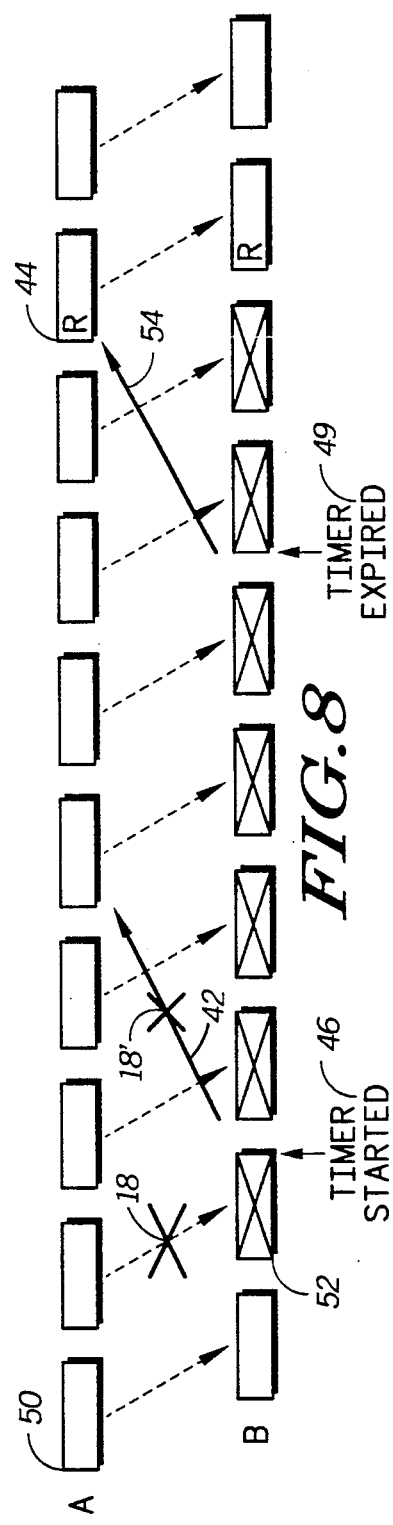
FIG. 8 is a chart of an error being corrected where the reset request is lost due to an error on the reverse channel.

If an error 18' occurs on the reverse channel 16', as shown in FIG. 8 and thus the decoder 22a does not receive the reset request codeword 42, the encoder 12a will not reset itself, and will fail to send a reset acknowledgement codeword 44. This situation is detected by site B when the reset acknowledgement codeword 44 has not been received before the timer expires 49. When the timer expires 49, a second reset request codeword 54 is sent over channel 16' to decoder 22a. The reset operation then proceeds as described above.

Note than if an error 18 occurs in the forward channel 16 and prevents the decoder 22b from receiving the reset acknowledgement codeword 44, the times will also expire and a second reset request codeword 42 will be sent. It should also be noted that errors may occur in successive reset request codewords or reset acknowledgement codewords, or in a combination of the two, and that the decoder 22b will keep sending reset request codewords until the whole protocol has been satisfied. Thus the protocol is capable of resetting the data encoding despite the occurrence of channel errors on forward channel 16 or reverse channel 16'.

A network equipped with the invention will perform data encoding and provide the advantages inherent to this type of data encoding in a way that is transparent to the end systems using the network. If errors occur on the network, they will appear no different from errors that would otherwise occur on an unreliable network, because the network is capable of resetting its data encoding before retransmission is started. Thus error propagation due to loss of synchronization will be limited to those frames that were sent prior to the retransmission.

The fact that the data encoding is continuous across frames allows the data encoding to recover in the case of an out-of-sequence or missing frame, as well.

Also, false resets may be generated, meaning a reset request (or reset acknowledgement) is generated when it is not needed. These false resets will typically mean only a momentary loss of compression efficiency, e.g., as the data compression algorithm relearns its vocabulary.

Error detection capability may be enhanced by the data encoding, and may also be used as an additional mechanism of error detection. For example, some algorithms destroy much of the data following an error. This enhances the error detection capabilities of the error detection algorithms as, in general, their detection reliability increases as the number of errors in a frame increases. Furthermore, in this type of algorithm one can periodically include a control codeword in the data at the encoder. If such a control codeword is then found to be absent at the decoder, an error is detected. It is also possible to detect illegal codewords in the data to be decoded, since in most algorithms there exist codewords which cannot appear in a valid sequence of codewords. The presence of such a codeword signals an error.

If go-back-n retransmission is used, there will be no degradation in network performance, as one error will cause that frame and all subsequent frames to be retransmitted. If selective retransmission is being performed, then the fact that the data encoding errors may propagate into subsequent frames until the data encoding is reset may cause some otherwise unnecessary frame retransmissions. But these may be offset by advantages inherent in the data encoding. For example, the amount of increased throughput of a network which uses a data compression algorithm may be much more significant than that lost in extra retransmissions.

Longer channels take longer to reset, as the reset request codeword and the reset acknowledgement codeword must each propagate through the length of the channel. It can thus be advantageous, when selective retransmission is being used, to simply reset the data encoding periodically, independent of any errors. In this way, the most time that is ever spent while the decoder is out of synchronization with the channel is the time between resets, which can be set to be shorter than the round-trip time of the network. As a special case of this periodic reset, if the frames are sufficiently long, it may be desirable to reset the encoder and decoder at the beginning of each frame. This has the advantage that no vocabulary needs to be stored between frames.

The time between resets, however, is constrained by the data encoding method. An adaptive data compression algorithm, for example, may not become efficient until it has accumulated a certain vocabulary, and hence increased frequency of resets may reduce compression efficiency. Networks where it is advantageous to use periodic resets are those in which $a > m/2$, where m is the minimal reset interval that still provides acceptable data encoding performance, and a is the round trip equivalent of the data. The minimal reset interval m is typically on the order of a few kilobytes for an adaptive data compression algorithm.

Figure 9:
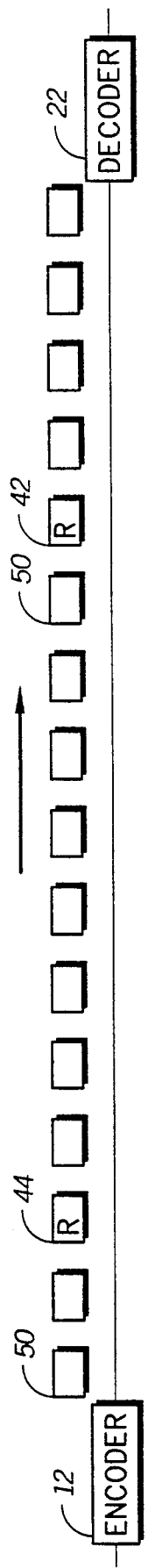
FIG. 9 is a diagram illustrating the propagation of frames through a channel using periodic reset.

The use of periodic reset is shown in FIG. 9. In this illustrated case, the data encoding is reset every nine frames, by sending frames 50 that include a reset ack codeword 44 every nine frames. The round trip equivalent of this illustrative channel is thirty-two frames. Using periodic reset is advantageous in this case, as single errors will only affect the decoding of at most nine frames, which is fewer than the thirty-two that would be affected using a reset protocol.

In some networks, it is advantageous to use a combination of the two techniques. In shorter paths within the network, the reset protocol would be the most advantageous, whereas longer ones would benefit from periodic reset. In a system which uses both techniques the choice of reset methods is made based on the configurations of the channel once the routing of the channel from node to node has been decided. For example, in FIG. 4, the X channel which passes via nodes a, b, c and d might use the reset protocol, while the Y channel passing via a longer path might use periodic resets.

In communication networks, it is not uncommon for several nodes to be communicating with the same node, and thus the decoding timers would have to be duplicated. In this type of situation, a way to reduce complexity is to use the same timer for all decoders at once. If a reset request codeword or a reset acknowledgement codeword is lost, and the timer expires, a second reset request codeword is sent on all of the channels waiting for a reset acknowledgement codeword, until the protocol is satisfied. This system is useful if the number of channels is not too large relative to the error rates on each channel.

Other embodiments are within the scope of the following claims. For example, the data encoding error detection (15,21) and end system error detection (14,20) might be combined, to reduce system complexity, but in practice it is generally preferable to keep these functions separate, as it is better not to constrain the end systems to a specific type of error detection. In this way, a network which includes data encoding may be used with different types of end systems, as long as they are designed to operate over unreliable channels. Although it would, in principle, be possible to build data encoding into the end systems 6, and thus avoid the need for separate error detection and reset capability for the encoding process, it is also generally preferable not to do so. By leaving data encoding to the network system, the expense and complexity of encoding need not be incurred in portions of the network where it is not cost effective. For example, data compression tends to be cost effective only on the backbone network and not the local portions of a network.

What is claimed is:

1. A method for transmitting encoded data across unreliable networks, said encoding being of a type in which encoding and decoding are synchronized, said method comprising the steps of:

encoding said data;

transmitting said encoded data across said unreliable network;

receiving and decoding said data;

subsequently detecting any errors introduced by said unreliable network; and resetting said encoding method upon said detecting of errors wherein error detection information is added to said data prior to encoding said data, and said error detecting information is used, following decoding, to detect any errors introduced by said unreliable network.

2. The method of claim 1 wherein said error detection information is a code sequence inserted into said data prior to encoding.

3. The method of claim 2 wherein said code sequence is a cyclic redundancy code (CRC).

4. The method of claim 1 wherein said unreliable network includes a plurality of nodes so arranged that a plurality of paths exist between at least some nodes between which said method is practiced.

5. The method of claim 4 wherein at least one node may communicate with more than one node at a time.

6. The method of claim 1 wherein said data encoding comprises data compression.

7. The method of claim 1 wherein said data encoding comprises encryption.

8. The method of claim 1 wherein each step of resetting said encoding method further includes transmitting a reset request code sequence over a reverse channel upon said detection of errors; and transmitting a request acknowledgement code sequence over said unreliable network to acknowledge reception of said reset request code sequence.

9. The method of claim 8 wherein:

the reset request code sequence initiates the resetting of an encoder; and the reset acknowledgement code sequence initiates the resetting of a decoder 10. The method of claim 9, wherein said step of resetting said encoding method further includes:

starting a timer upon said detection of errors;

transmitting a second reset request code sequence over said reverse channel upon failure to receive said request acknowledgement code sequence upon an expiration of said timer.

11. The method of claim 10 wherein said unreliable network further includes a plurality of nodes so arranged that a plurality of paths exist between at least some nodes between which said method is practiced; and wherein at least one node may communicate with more than one node at a time using different encoding methods to communicate with at least two different nodes; and wherein said timer is shared by said different encoding methods.

12. The method of claim 1 wherein said data encoding comprises data compression; and wherein said step of resetting said data encoding includes resynchronizing an encoder and a decoder of said data compression.

13. The method of claim 12 wherein error detection information is added to said data prior to encoding said data, and said error detection information is used, following decoding of said data, to detect any errors introduced by said unreliable network.

14. The method of claim 12 wherein said unreliable network includes a plurality of nodes so arranged that a plurality of paths exist between at least some nodes between which said method is practiced.

15. A method for transmitting encoded data across unreliable networks, said encoding being of a type in which encoding and decoding are synchronized, said method comprising the steps of:

encoding said data using a data encoding method;

transmitting said encoded data across said unreliable network;

receiving and decoding said data; and at intervals, resynchronizing said encoding method wherein the resynchronizing of said encoding method occurs periodically at frame boundaries 16. The method of claim 15 wherein the resynchronizing of said encoding method occurs at every frame boundary.

17. The method of claim 15 wherein said unreliable network includes a plurality of nodes so arranged that a plurality of paths exist between at least some nodes between which said method is practiced.

18. The method of claim 17 wherein at least one node may communicate with more than one node at a time.

19. The method of claim 15 wherein said data encoding comprises data compression.

20. The method of claim 15 wherein said data encoding comprises encryption.

21. The method of claim 15 wherein said step of periodically resetting is used on a first set of paths in said network and wherein a reset method is used on a second set of paths different from said first set, said reset method comprising the steps of:

encoding said data using a data encoding method;

transmitting said encoded data across said second set of paths in said unreliable network;

receiving and decoding said data;

subsequently detecting any errors introduced by said second paths; and resetting said encoding method upon said detection of errors.

* * * * *

UNITED STATES PATENT AND TRADEMARK OFFICE
CERTIFICATE OF CORRECTION

PATENT NO. : 5,130,993

DATED : July 14, 1992

INVENTOR(S) : Michael Gutman, Michael G. Hluchyj, and James A. Pasco-Anderson

It is certified that error appears in the above-identified patent and that said Letters Patent is hereby corrected as shown below:

In the Claims:

Column 7, line 32, "detecting" should be --detection--.

Signed and Sealed this

Thirty-first Day of August, 1993

Attest:

BRUCE LEHMAN

Attesting Officer

Commissioner of Patents and Trademarks